United States Patent
Rusnack et al.

(10) Patent No.: US 7,031,024 B2
(45) Date of Patent: Apr. 18, 2006

(54) IMAGE DATA PROCESSING METHODS, IMAGE DATA PROCESSING APPARATUSES AND SCANNER SYSTEMS

(75) Inventors: Michael R. Rusnack, Boise, ID (US); Ronald C. Slutz, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 223 days.

(21) Appl. No.: 10/389,386

(22) Filed: Mar. 13, 2003

(65) Prior Publication Data

US 2003/0174353 A1  Sep. 18, 2003

Related U.S. Application Data

(63) Continuation of application No. 09/244,806, filed on Feb. 5, 1999, now Pat. No. 6,577,408.

(51) Int. Cl.
*G06F 15/00* (2006.01)
*G03F 3/08* (2006.01)
*G06K 9/00* (2006.01)

(52) U.S. Cl. .................. 358/1.9; 358/518; 382/167
(58) Field of Classification Search .............. 358/1.9, 358/1.15, 515, 518, 504, 509; 382/167, 162
See application file for complete search history.

(56) References Cited

U.S. PATENT DOCUMENTS

| | | | |
|---|---|---|---|
| 4,038,685 A | 7/1977 | Bazin | |
| 4,415,925 A | 11/1983 | Tamura | |
| 4,841,337 A * | 6/1989 | Hiratsuka et al. | 347/119 |
| 4,935,809 A | 6/1990 | Hayashi et al. | |
| 4,994,901 A | 2/1991 | Parulski et al. | |
| 5,216,493 A * | 6/1993 | DiBella et al. | 358/29 |
| 5,233,413 A | 8/1993 | Fuschsberger | |
| 5,289,295 A | 2/1994 | Yumiba et al. | |
| 5,341,228 A | 8/1994 | Parker et al. | |
| 5,357,352 A | 10/1994 | Eschbach | |
| 5,371,615 A | 12/1994 | Eschbach | |
| 5,386,229 A | 1/1995 | Suzuki | |
| 5,570,129 A | 10/1996 | Hafele et al. | |
| 5,621,479 A | 4/1997 | Akiyama | |
| 5,654,809 A * | 8/1997 | Beeman et al. | 358/504 |
| 5,737,032 A | 4/1998 | Stenzel et al. | |
| 5,781,709 A | 7/1998 | Usami et al. | |
| 5,867,285 A | 2/1999 | Hirota et al. | |
| 5,986,718 A | 11/1999 | Barwacz et al. | |
| 6,037,947 A * | 3/2000 | Nelson et al. | 345/426 |
| 6,113,210 A * | 9/2000 | Gotoh et al. | 347/15 |
| 6,115,022 A | 9/2000 | Mayer, III et al. | |
| 6,125,201 A * | 9/2000 | Zador | 382/166 |

* cited by examiner

*Primary Examiner*—Madeleine Nguyen

(57) ABSTRACT

The method of the invention corrects for a color shift in a color scan mechanism. The method initially senses plural component color data that is derived from the color scan mechanism. A determination is made of whether at least one color component value exhibits a value that exceeds a first threshold. The method also determines if another color component exhibits a value that exceeds a second threshold. If it is determined that both of the color components exceed the respective thresholds, then the one color component value is altered to a predetermined desired color value, so as to correct for color shift.

13 Claims, 2 Drawing Sheets

IMAGE DATA PROCESSING METHODS, IMAGE DATA PROCESSING APPARATUSES AND SCANNER SYSTEMS

RELATED PATENT DATA

This patent resulted from a continuation of and claims priority to U.S. patent application Ser. No. 09/244,806, filed on Feb. 5, 1999, now U.S. Pat. No. 6,577,408, entitled "Method and Apparatus for Correcting Blue Drift In an Image Scanner" naming Michael R. Rusnack and Ronald C. Slutz as inventors, the disclosure of which is incorporated herein by reference.

FIELD OF THE INVENTION

This invention relates to image scanners and, more particularly, to a method and apparatus for enabling automatic correction of blue drift which can occur in scanned image data acquired during a scan action.

BACKGROUND OF THE INVENTION

Currently, many image scanners employ cold cathode fluorescent bulbs as a light source. During a scan action, relative movement between the fluorescent light source and a document being scanned enables capture of the image data from the document. Full color scanners enable acquisition of red, green and blue data during the scan action. A scanner that is capable of scanning a full color image can take up to 8 minutes to complete a scan of a single page due to the large amounts of color data which must be accumulated. For instance, during such a scan, each pixel is represented by (for example) 24 bits of data. By contrast, a black/white image only requires one bit per pixel.

Cold cathode fluorescent lamps inherently exhibit a blue shift in their light spectrum when they are powered for more than several minutes. Thus, during a scan of a full color image (which, as indicated above, can take up to 8 minutes), a significant blue shift can and does occur in the light output spectrum of the fluorescent lamp, which blue shift is detected by the light sensors within the scanner. Such blue shift causes an unwanted blue hue in white background areas of a scanned image, among other color anomalies.

The prior art, in attempting to correct the blue shift phenomenon found in scanners, has attempted to modify the scan head structure to compensate for the blue drift. Such a modification widens the scan region seen by the color sensors and includes a calibration strip. The scanned calibration strip data provides known color values which are used to adjust or compensate the scanned image data when blue drift occurs. Such a solution adds additional expense to the scanning mechanism and is subject to error if the calibration strip becomes occluded via deposited dust.

Accordingly, there is a need for method and apparatus which corrects for blue drift and which avoids the need for modifications to scanner structures.

Further, such method and apparatus should enable the blue drift correction in such a manner as to be independent of calibration strips and the like.

SUMMARY OF THE INVENTION

The method of the invention corrects for a color shift in a color scan mechanism. The method initially senses plural component color data that is derived from the color scan mechanism. A determination is made of whether at least one color component value exhibits a value that exceeds a first threshold. The method also determines if another color component exhibits a value that exceeds a second threshold. If it is determined that both of the color components exceed the respective thresholds, then the one color component value is altered to a predetermined desired color value, so as to correct for color shift.

DETAILED DESCRIPTION OF THE INVENTION

As indicated above, color digital data output from red, green and blue sensors in a scanner comprise red, green and blue color component values. In the example to be described below, it will be assumed that each color component is comprised of 8 bits, enabling 0–255 color component values. A full color value is comprised of three consecutive 8-bit bytes called an RGB triplet, with a triplet value of 255,255,255 being pure white, and 0,0,0 being pure black.

A drift to blue occurs when the fluorescent light source in the scan head overheats, resulting in a drop-out in the red channel, (e.g., R=242, G=255, B=255). This causes a shift in the white color towards cyan and is most noticeable in the white. It has been determined that the shift from a full white value of 255 is the result of a drop-out in the red channel, with the green and blue channels being unaffected. Accordingly, it has been determined that if such a condition is sensed, i.e., a red channel drop-out, which causes the red value to drop below a threshold value, that a blue shift is occurring. Under such conditions, as will be understood from the detailed description below, Applicants' invention forces the red value back to a maximum value (e.g., 255), thereby correcting the shift.

Figure 1:
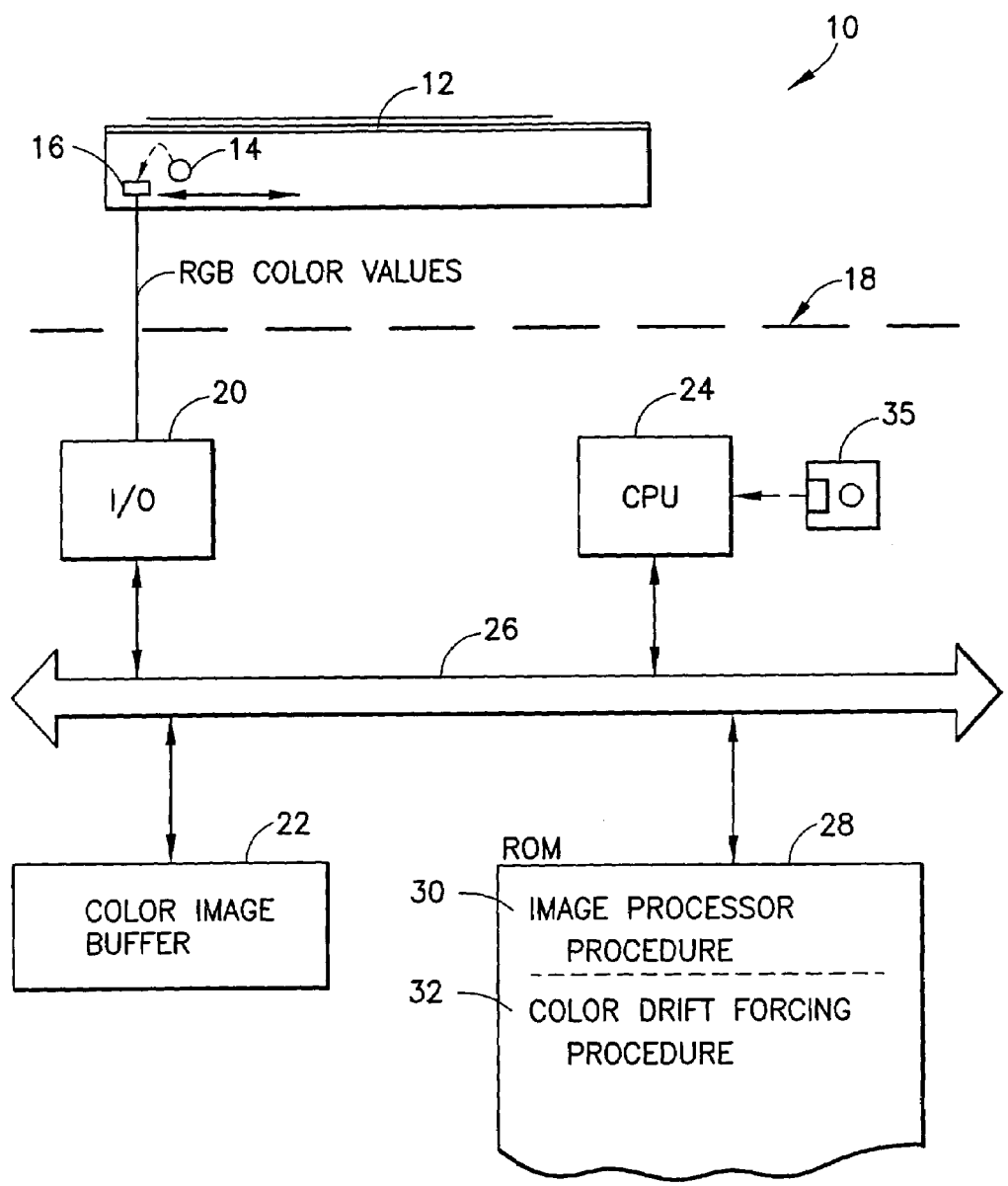
FIG. 1 is a block diagram of a scanner system adapted to implement the invention.

Turning now to FIG. 1, a scanner 10 includes a platen 12 on which a document to be scanned is placed. A light source 14 and color detector system 16 are moved beneath platen 12 to enable a scanning to occur of the document on platen 12. It is to be understood that the described structure of scanner 10 is only exemplary, as other scanners cause the document to move relative to a fixed scanner/sensor mechanism.

Sensed red, green and blue color values are output from sensor 16 to a computer 18 and, via an input/output module 20 into a color image buffer 22. A central processing unit (CPU) 24 is coupled, via a bus system 26, to both a color image buffer 22 and a read-only memory (ROM) 28. Within ROM 28 resides an Image processor procedure 30 which is adapted to convert the sensed color data into image data that is suitable for further processing.

Image processor procedure 30 includes a color drift forcing procedure 32 which detects the red, green and blue values of each pixel and, under conditions to be described, reverses any color drift which occurs as a result of, for instance, an overheating of light source 14.

Note that while it is assumed that each of the controlling procedures to be further described below are assumed to be already present within computer 18, they may be instead, stored on a memory media, such as magnetic diskette 35 shown in FIG. 1. Then, on an as-needed basis the controlling code may be downloaded into a memory within computer 18.

Figure 2:
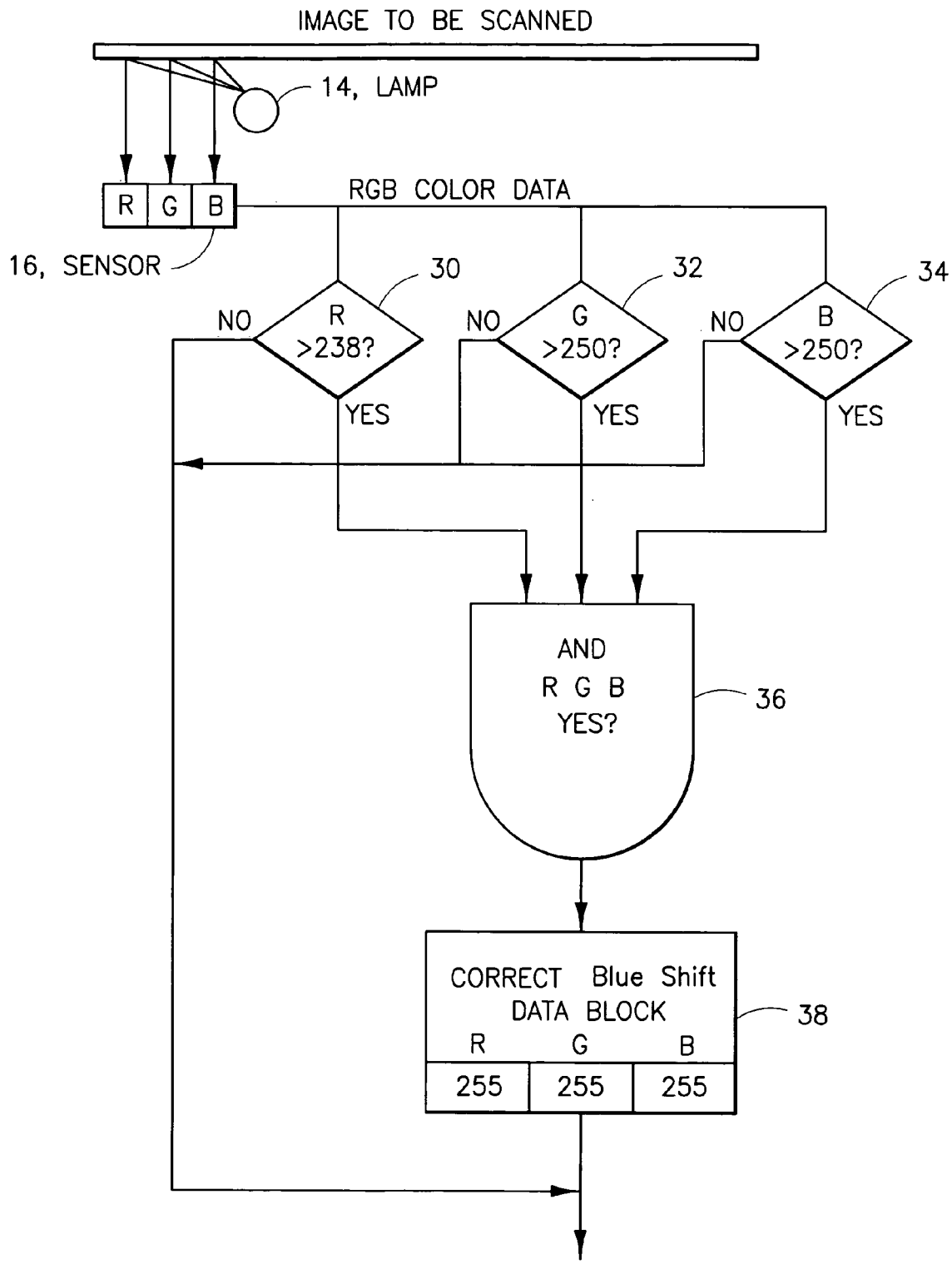
FIG. 2 is a logic flow diagram that illustrates the procedure of the invention.

Turning now to FIG. 2, further details of color drift forcing procedure 32 will be described. As indicated above, relative movement between lamp 14 and a document image on platen 12 causes RGB triplet values to be acquired by sensor 16. Those RGB triplet values are buffered in color image buffer 22 (FIG. 1) and are then processed by color drift forcing procedure 32. That procedure initially determines a digital value of the red, green and blue components of each RGB triplet.

Color drift forcing procedure 32 is provided with individual R, G and B threshold values which must be respectively exceeded before the color forcing action of the invention occurs. The individual color threshold values to be discussed below (and that are shown in FIG. 2) are provided merely for exemplary purposes. One skilled in the art will realize that other threshold values may be set, depending upon the desired levels at which the color drift correction action is to be invoked.

In this instance, as shown by decision steps 30, 32 and 34, the R, G and B threshold parameter values are 238, 250 and 250, respectively. (This, of course, assumes that each color component is represented as an eight-bit byte). Thus, if a pixel's green and blue color component values exceed threshold values of 250, and the pixel's red color component value exceeds a color value of, for instance, 238, then it is assumed that the pixel color is actually white, rather than the slightly blue hue which would be created by the respective color component values.

Step 36 is shown as an AND function and responds to each of decision steps 30, 32 and 34 issuing yes indications, to output an enable signal to "correct blue shift data" block 38. Upon receiving such an enable signal, correct blue shift data block 38 outputs a color triplet comprising the values 255, 255, 255 for the respective R, G and B color components.

As can be seen from the above, the procedure of the invention forces maximum R, G and B values to be output from correct blue shift data block 38 even when the inputs from color sensors 16 indicate otherwise, but respectively exceed the RGB threshold values shown in decision steps 30, 32 and 34. If any one of decision steps 30, 32 or 34 determines that the indicated threshold has not been exceeded, then the entire process is bypassed and the color values are accepted, as is.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An image data processing method comprising:
providing a plurality of color component values for respective ones of a plurality of color components, wherein the color component values correspond to an image;
first analyzing a first of the color component values with respect to a first threshold;
second analyzing a second of the color component values with respect to a second threshold;
adjusting the first of the color component values to an other value to correct for color shift responsive to the first analyzing determining the first of the color component values exceeds the respective first threshold and the second analyzing determining the second of the color component values exceeds the respective second threshold; and
wherein the first and second thresholds are different.

2. The method of claim 1 wherein the providing comprises providing the color component values comprising provided values, and further comprising substantially maintaining the first of the color component values at the provided value of the first color component value responsive to one of the first analyzing determining the first color component value does not exceed the first threshold and the second analyzing determining the second color component value does not exceed the second threshold.

3. The method of claim 1 further comprising third analyzing a third of the color component values with respect to a third threshold, and wherein the adjusting the first of the color component values is responsive to the third analyzing determining the third of the color component values exceeds the respective third threshold.

4. The method of claim 1 wherein the first of the color component values is a red color component value.

5. The method of claim 1 wherein the providing comprises providing the plurality of color component values using a color scan mechanism.

6. The method of claim 1 wherein the other value is a constant value.

7. The method of claim 1 wherein the other value is a value independent of the provided color component values.

8. The method of claim 1 wherein the other value is a predetermined constant value independent of the provided color component values.

9. The method of claim 1 wherein the adjusting comprises adjusting the second of the color component values to an other value responsive to the first analyzing determining the first of the color component values exceeds the respective first threshold and the second analyzing determining the second of the color component values exceeds the respective second threshold.

10. The method of claim 1 wherein the providing comprises providing a plurality of different values for the first of the color component values, and the adjusting comprises adjusting one of the plurality of different values and not adjusting an other of the plurality of different values.

11. The method of claim 1 wherein the providing comprises providing a plurality of different values for the first of the color component values, and the adjusting comprises adjusting the plurality of different values to the same other value which is a constant value.

12. The method of claim 1 wherein the other value is a maximum value for the first of the color component values.

13. The method of claim 1 wherein the first threshold and the second threshold comprise different values.

* * * * *